Figure 1:
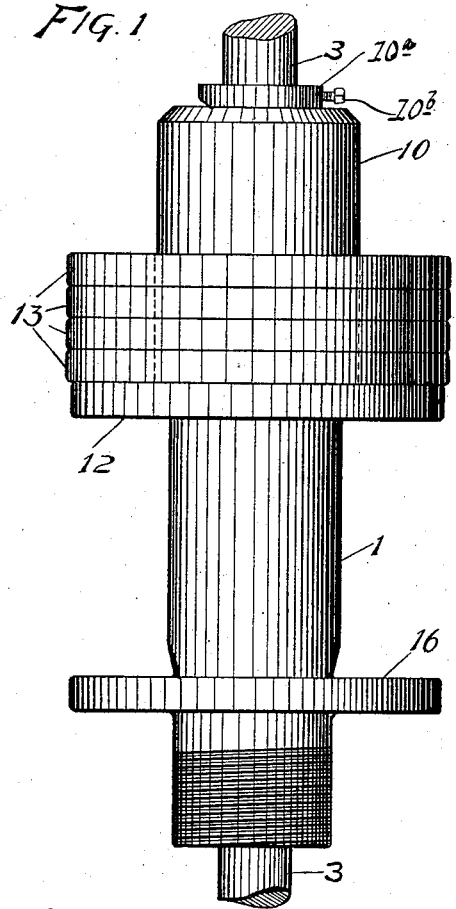

E. C. KAHLE.
STUFFING BOX.
APPLICATION FILED JUNE 3, 1911.

1,015,685.

Patented Jan. 23, 1912.

WITNESSES:
Erich Burkly
K. H. Butler

INVENTOR.
E. C. KAHLE
BY
H. C. Everett Co.
ATTORNEYS.

COLUMBIA PLANOGRAPH CO., WASHINGTON, D. C.

UNITED STATES PATENT OFFICE.

EUGENE C. KAHLE, OF OIL CITY, PENNSYLVANIA.

STUFFING-BOX.

1,015,685.  Specification of Letters Patent.  Patented Jan. 23, 1912.

Application filed June 3, 1911. Serial No. 631,034.

*To all whom it may concern:*

Be it known that I, EUGENE C. KAHLE, a citizen of the United States of America, residing at Oil City, in the county of Venango and State of Pennsylvania, have invented certain new and useful Improvements in Stuffing-Boxes, of which the following is a specification, reference being had therein to the accompanying drawing.

This invention relates to stuffing boxes and more particularly to boxes designed for polish rods of oil wells, pistons and other bodies around which is maintained a non-leakable connection between another body.

The objects of my invention are to provide positive and reliable means, in a manner as will be hereinafter set forth, for maintaining a constant pressure upon packing located in a box or similar receptacle, and to furnish a stuffing box with an auxiliary supply of packing material adapted to be shifted to compensate for the wear and tear upon the main packing of the box.

Other objects of my invention are to eliminate the uneven and irregular tension upon packing by providing means for automatically exerting a constant and invariable minimum pressure upon the packing to prevent leakage, to produce thereby a monetary saving by providing a packing box that obviates the unnecessary pressure and necessity of removing old packing.

Further objects of the invention are to furnish a stationary stuffing box with a movable packing gland adapted to be fed by gravity toward the stationary box to supply the same with packing, and to provide a stuffing box that can be advantageously used in a vertical position for excluding rain, snow, ice and other matter that under ordinary conditions cause considerable trouble in maintaining an air, steam or water tight connection around a movable body.

Further objects of my invention are to provide a gravity packed stuffing box in which the packing can be easily and quickly removed or renewed, and to accomplish the above results by a mechanical construction that is simple, durable, easy to install and highly efficient for the purposes for which it is intended.

With the above and other objects in view, the invention resides in the novel construction, combination and arrangement of parts to be hereinafter specifically described and then claimed.

Reference will now be had to the drawing, wherein there is illustrated a preferred embodiment of the invention, but it is to be understood that the structural elements thereof are susceptible to such changes as fall within the scope of the appended claims.

Figure 2:
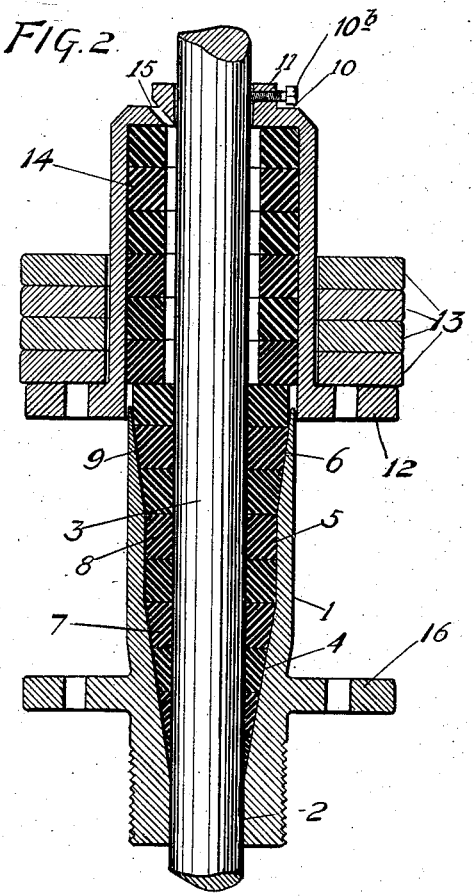
Figure 3:
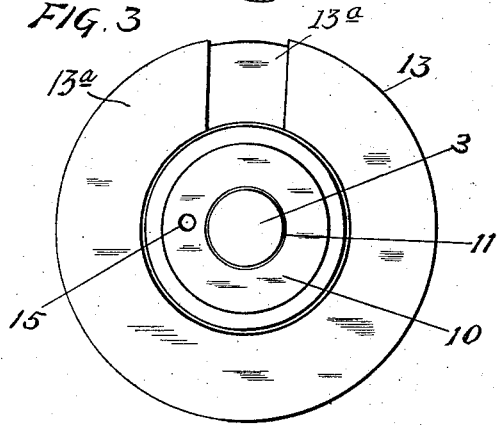
Figure 4:
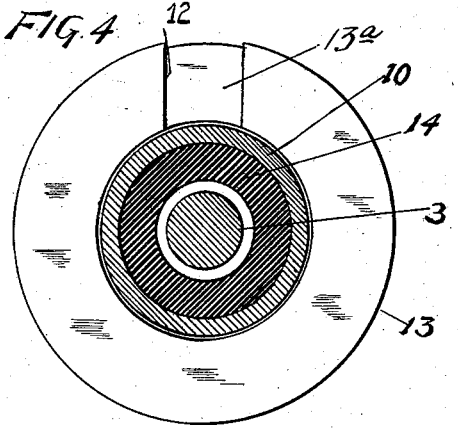

In the drawings:—Figure 1 is a side elevation of the stuffing box, Fig. 2 is a vertical sectional view of the same, Fig. 3 is a plan of the stuffing box, and Fig. 4 is a horizontal sectional view of the movable gland thereof.

The reference numeral 1 denotes a cylindrical packing box having the lower end thereof provided with a central longitudinal bore 2 for a piston rod 3. The bore 2 has the upper end thereof enlarged to provide a tapering portion 4, a cylindrical portion 5 and another tapering portion 6, the cylindrical portion 5 being arranged intermediate the tapering portions 4 and 6, with the tapering portion 4 converging toward the bore 2. The enlarged end of the bore is adapted to accommodate packing rings 7, 8 and 9, the packing rings 7 being arranged in the tapering portion 4 and surrounding the rod 3, the rings being of various sizes whereby they can be superimposed to insure a non-leakable connection between the rod and the walls of the bore. The rings 8 are all of the same size and are located in the cylindrical portion 5, while the rings 9 vary in size and snugly fit within the tapering portion 6. The rings 7, 8 and 9 are preferably made of rubber or a yieldable composition, although any desired material can be used and packed within the enlarged end of the bore 2.

Arranged upon the upper end of the box 1 and adapted to slide thereon is an inverted cup-shaped packing holder or gland 10 having the top thereof provided with an opening 11 providing clearance for the rod 3. The lower end of the gland has a flange 12 and this flange is adapted to support a plurality of superimposed circular weights 13. The weights 13 are slotted as at 13ª said slot being approximately the same width as the diameter of the rod 3; the interior circular opening being of such diameter as will permit the weights to snugly embrace and pass over the gland 10, resting upon the flange 12; the rings being so formed as to prevent a lateral displacement from said gland. Arranged within the gland are a plurality of superimposed packing rings 14, all of the same diameter and made of a material similar to the rings of the box.

The top of the box is provided with a lubricant port 15, whereby a lubricant can be placed in the stuffing box or the gland thereof to insure an easy movement of the rod 3 within said stuffing box.

In order that the stuffing box can be secured to a suitable support, the box has the lower end thereof screw threaded and provided with a flange 16.

The collar 10$^a$ is integral with the gland 10 and is provided with a screw 10$^b$, for the purpose of rigidly securing the gland 10 to the rod 3, while refilling the gland 10 with packing.

The gland 10 is adapted to be fed by gravity upon the stuffing box 1 and in order that the packing rings of the gland will be fed into the box to compensate for the wear and tear upon the rings 7, 8 and 9, a sufficient number of weights can be placed upon the flange 12 of the gland. With the stuffing box and the gland cylindrical, the weights can be made circular whereby they will exert a pressure that is equally distributed upon the packing in the stuffing box, thereby insuring an equal wear of the packing without the necessity of giving the same any attention, other than to place packing rings within the gland 10 as they are used.

When the stuffing box is used in a vertical position, it is unnecessary to use nuts and bolts or any other fastening means for the purpose of adjusting the gland relatively to said box, although in some cases it may be found desirable to connect the gland 10 and casing 1, by means of bolts and nuts (not shown in the drawings) to prevent the displacement of the gland 10, should the latter adhere to the rod 3, from any cause whatever, such as freezing, etc.

What I claim is:—

1. A stuffing box having a bore formed therein adapted to receive a rod, compressible packing rings arranged in the bore of said box, and a gland movably mounted upon the end of said box and containing compressible packing mounted upon said rings and adapted to enter said box as the gland descends.

2. A stuffing box having a bore formed therein with one end of said bore enlarged, said enlarged end of said bore having tapering and cylindrical portions, packing rings of various sizes arranged in the enlarged end of and snugly fitting the wall of the bore of said box, said packing rings being compressible, a weighted gland movably mounted upon the upper end of said box, and compressible packing rings arranged in said gland and mounted upon the packing rings in the box and adapted to enter said box as the gland descends.

3. The combination with a rod, of a stuffing box surrounding said rod, compressible packing rings of various sizes arranged in said box, a gravity gland movably mounted upon the upper end of said box and adapted to descend thereon by gravity, and compressible packing rings arranged within said gland and mounted upon the packing rings in the box and adapted to be fed into said box as the gland descends.

4. A stuffing box having a bore formed therein with the upper end of said bore enlarged to provide tapering and cylindrical portions, compressible packing rings of various sizes arranged in the enlarged end of the bore of said box, an inverted cup-shaped gland movably mounted upon the outer side of said box and adapted to descend thereon by gravity, circular weighted elements mounted upon the gland for lowering it, and packing rings arranged in said gland and mounted upon the packing rings in the box and adapted to be fed into said box as the gland descends.

5. A stuffing box having a bore formed therein with the upper end of said bore enlarged to provide tapering and cylindrical portions, compressible packing rings of various sizes arranged in the enlarged end of the bore of said box, an inverted cup-shaped gland movably mounted upon the outer side of said box and adapted to descend thereon by gravity, said gland provided with a flanged compressible packing ring arranged in said gland and mounted upon the packing rings in the box and adapted to be fed into said box as the gland descends, and a plurality of circular weights detachably mounted upon the flange of said gland for lowering the latter, substantially as described.

6. A stuffing box consisting of telescopic cylindrical portions, compressible packing rings arranged therein, the upper of said portions provided with a flange and a removable weight surrounding the flanged cylindrical portion and mounted upon the flange of the latter thereby causing the upper portion to descend upon the lower portion and forcing the packing rings of the upper portion into those of the lower portion.

7. A stuffing box comprising a pair of telescopic hollow members, compressible packing rings mounted therein, a support carried by one of said members, and evenly distributed weighting means mounted upon said support for causing that member having the support to descend whereby the packing rings carried by said member will be caused to enter the other of said members.

8. A stuffing box consisting of two telescopic members, a plurality of circular weights surrounding one of said members, and evenly distributing weight thereon to cause said member to descend uniformly with respect to the other member, and means for supporting said weights.

In testimony whereof I affix my signature in the presence of two witnesses.

EUGENE C. KAHLE.

Witnesses:
   MAX H. SROLOVITZ,
   KARL H. BUTLER.

Copies of this patent may be obtained for five cents each, by addressing the "Commissioner of Patents, Washington, D. C."